United States Patent [19]
Woydick et al.

[11] Patent Number: 5,529,259
[45] Date of Patent: Jun. 25, 1996

[54] SEAT BELT RETRACTION MECHANISM

[75] Inventors: Mark C. Woydick, Romeo; William L. Palmer, Rochester, both of Mich.

[73] Assignee: AlliedSignal Inc., Morristown, N.J.

[21] Appl. No.: 113,944

[22] Filed: Aug. 30, 1993

[51] Int. Cl.$^6$ .................................................. B60R 22/405
[52] U.S. Cl. ........................ 242/376; 242/379; 242/383.4
[58] Field of Search .................................. 242/376, 383.4, 242/587.1, 613.4, 613.5, 379, 379.1; 280/806, 807; 297/475, 476, 477, 478

[56] References Cited

U.S. PATENT DOCUMENTS 4,254,921  3/1981  Adomeit .

FOREIGN PATENT DOCUMENTS 538317  8/1984  Australia .
0152909  8/1985  European Pat. Off. .
2476491  8/1981  France .
3421945  12/1985  Germany .

*Primary Examiner*—John M. Jillions
*Attorney, Agent, or Firm*—Markell Seitzman

[57] ABSTRACT

A seat belt retractor (30) comprising: a frame (32) having a base and two parallel side walls (34,36) extending therefrom, each side wall includes an first opening (40 41) therein, a spool (50, 54), rotatably positioned relative to the side walls, first and second disks (92a,b) positioned relative to the spool, a plurality of bars or pins, the first and second disks positioned on opposite sides of the spool, the pins received within cooperating bores in the spool and joining the disks together, a shaft rotationally linked to the disks for providing an axis of rotation of the spool and disks, a locking mechanism for engaging the disks to prevent protraction of safety belt webbing.

16 Claims, 2 Drawing Sheets

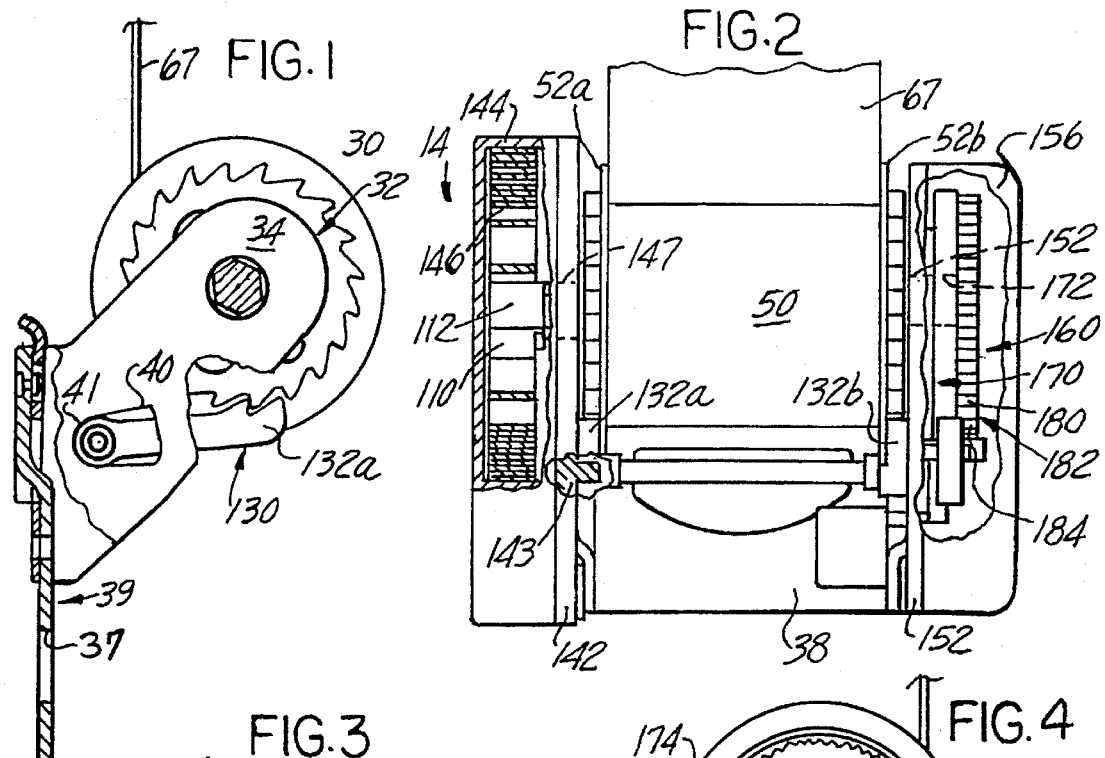
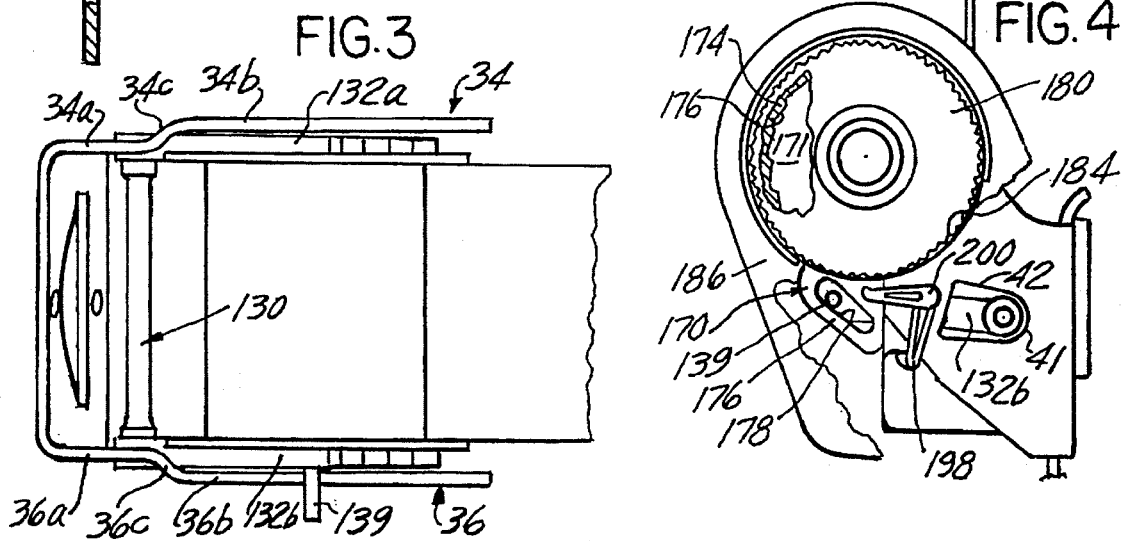
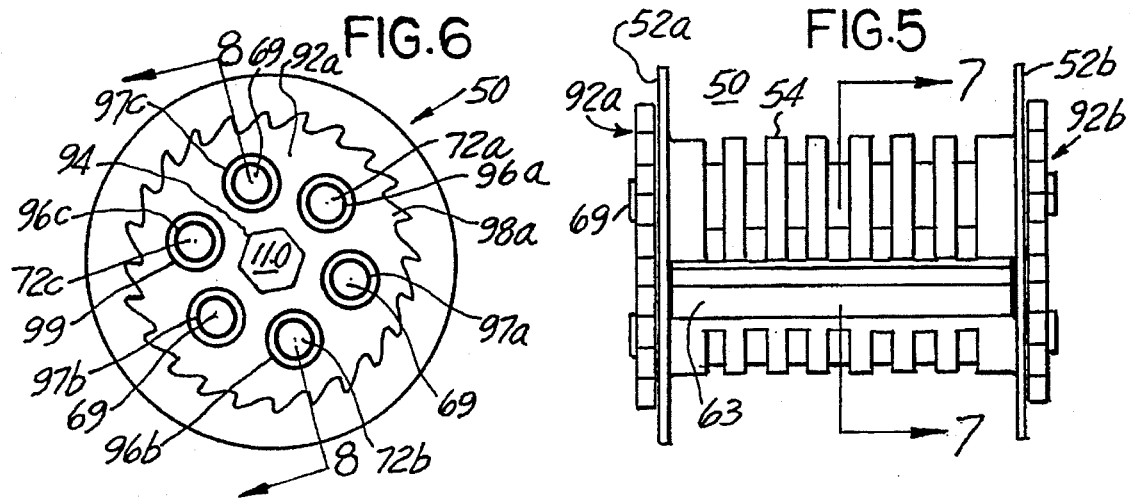

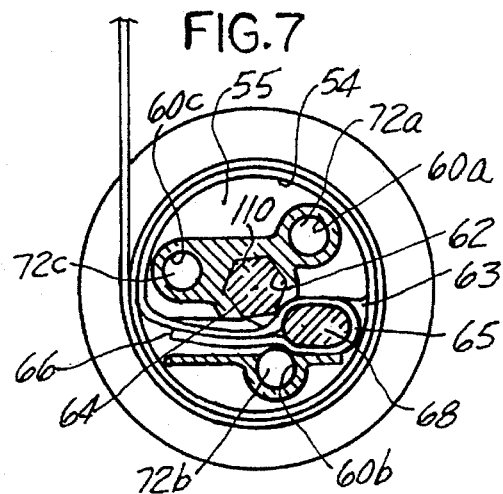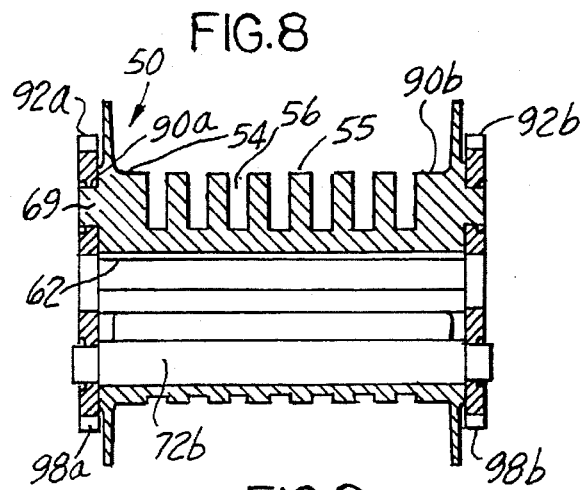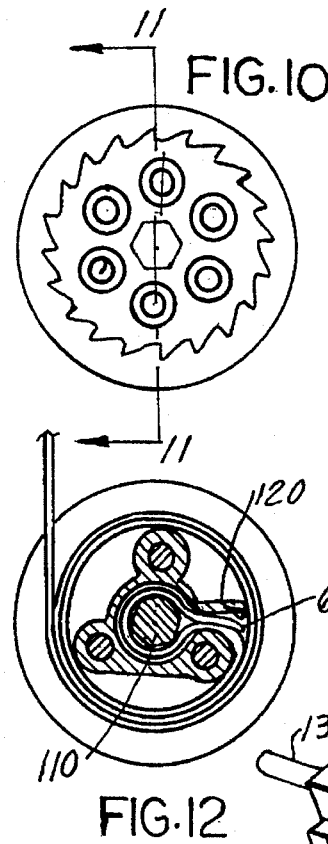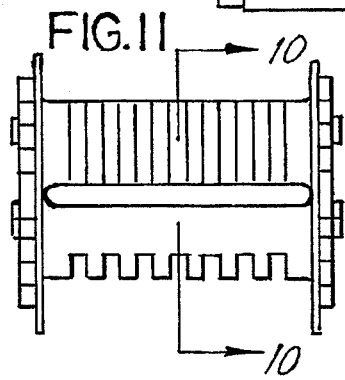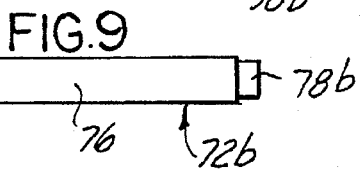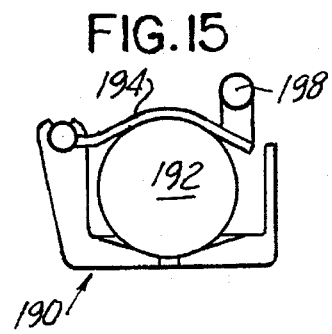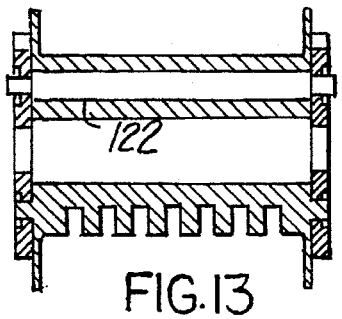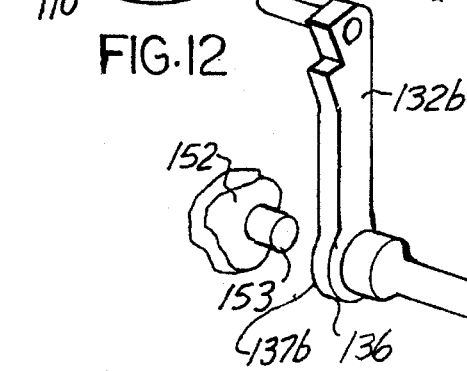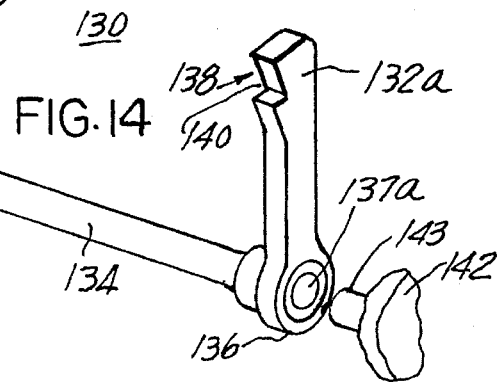

ID  5,529,259

SEAT BELT RETRACTION MECHANISM

BACKGROUND AND SUMMARY OF INVENTION

The present invention generally relates to seat belt retraction mechanisms.

Seat belts and retractors are commonly used as part of a safety restraint system to protect vehicle occupants. A typical retractor includes a spool, a frame for supporting the spool, a locking mechanism(s) to stop the spool from rotating and web and/or vehicle sensors for initiating spool lockup upon sensing certain dynamic criteria.

A practical seat belt retractor should of course be of low cost and of high quality. The underlying design must be flexible to accommodate varying customer performance criteria. Such criteria will generally include, in addition to the above: small package size to permit the retractor to be easily fit into virtually any location and any orientation within a vehicle, and light weight construction. In addition, the retractor should be relatively easy to manufacture and have a design amenable to automated manufacturing techniques. The retractor should be characterized by low belt extraction and retraction forces and an overall quiet operation. The retractor should be capable of using one or more sensors such as a web sensor and vehicle sensor without a major change in the basic structure of the retractor and be smooth in its operation and not jam, as well as be capable of withstanding loading forces in the range of 18 KN.

It is the object of the present invention to provide an improved seat belt retractor.

Accordingly, the invention comprises: a seat belt retractor comprising: a frame having a base and two parallel side walls extending therefrom. The retractor additionally includes a spool, rotatably positioned relative to the side walls. A support frame or skeleton is provided for the spool enabling same to be fabricated of less costly, lightweight, non-structural material. The support frame, as opposed to the spool, effectively absorbs the forces developed during operation. The support frame or skeleton comprises first and second disks joined by a plurality of bars or pins. The first and second disks are positioned on opposite sides of the spool and the pins extend through the spool such as through cooperating bores in the spool. A shaft, of defined shape is received in a complementary shaped opening in each disk to rotationally link the disks together and also to provide an axis of rotation of the spool and disks.

In the preferred embodiment of the invention, the frame is stepped, kinked or bent defining a shoulder therein. A dual acting pawl locking mechanism is supported upon the frame sides and movable into engagement with teeth formed on the disks. The frame is designed to facilitate drop-in insertion of the locking mechanism. The locking mechanism is moved into locking engagement upon activation of one or more sensing mechanisms such as a vehicle and web sensor.

Many other objects and purposes of the invention will be clear from the following detailed description of the drawings.

BRIEF DESCRIPTION OF THE DRAWINGS

In the drawings:

FIGS. 1, 2 and 3 are side, front and bottom views of major components of a retractor incorporating the present invention.

FIG. 4 shows another side view of the retractor illustrating some sensor components.

FIGS. 5–8, show various views of a spool.

FIG. 9 shows a plan view of a pin.

FIGS. 10–13, illustrates various views of a alternative embodiment of the spool.

FIG. 14 show a projected view of a locking mechanism.

FIG. 15 is a plan view of a vehicle sensor.

DETAILED DESCRIPTION OF THE DRAWINGS

With reference to FIGS. 1–4 there is shown a retractor 30 comprising a U-shaped frame generally shown as 32 having two parallel side walls 34 and 36 which extend outwardly from a bottom 38. Part of side wall 34 has been removed in FIG. 1 to show part of a locking mechanism. An additional mounting plate 39 is received on a frame 32 to enable the retractor 30 to be mounted to a cooperating part of a vehicle. Mounting plate 39 includes an opening 37 for an associated fastener (not shown). As can be seen from FIGS. 2 and 3, each side wall has a step, or bend and includes a narrow inner wall portion 34a and 36a, a wider outer portion 34b and 36b joined by an outwardly extending shoulder 34c and 36c. Each side wall 34 and 36 includes a pocket or opening, such as 40 and 42. In the illustrated embodiment the pocket is shaped to permit the installation and operation of a locking mechanism 130. The pocket 40 is somewhat oval shaped having wide open portion and a narrow circular rear portion 41. As can be seen, pocket 40 is formed in side wall 34a. The pocket or opening 42, positioned in side wall 36, is of similar construction as can be seen in FIG. 4.

Positioned between the side walls 34 and 36 is a spool generally shown as 50 upon which webbing 67 is wound. The spool is shown in greater detail in the accompanying figures. The spool includes two oppositely positioned flanges 52a and 52b. As can be seen in FIGS. 5–8, the spool 50 additionally includes a center body 54. The body 54 can be formed with a cylindrical body surface (constant radius) or a surface of varying radius such as a Archimedean spiral. A plurality of cut-outs or cores such as 56 are formed within the body 54 to reduce the overall weight of the spool and to reduce shrinkage if the spool is molded. By introducing the cut-outs or cores a plurality of ribs 55 are formed. As can be seen in FIG. 8, the spool includes a central bore 62. In this embodiment of the spool the bore 62 is generally hexagonally shaped. The bore 62 extends through the end flanges 52a and 52b. Fabricated within the body 54 of the spool are also a plurality of through bores 60a,b and c, some of which are shown in FIGS. 7 and 8. As can be seen one of these through bores such as 60b has an open side permitting part of a pin to extend therefrom. The spool body 54 additionally includes a slot 63 eccentrically or offset positioned relative to the center 64 of bore 62. The center bore 62 is open on one of its sides permitting a part of the shaft to extend therefrom. The center bore 62 and shaft 110 also define the rotationally centerline or axis of the spool 50. The cooperation with an exposed side of the shaft 110, only shown in FIG. 7, and the exposed side of one of the pins 72b provides a convenient means of entrapping a looped end 65 of the seat belt webbing 67 which is secured by stitches 66. The spool 50 additionally includes a plurality of locating features such as a plurality of positioning bosses 69 which extend from outer surfaces 90a and 90b of the flanges as shown in FIG. 8.

Reference is again briefly made to FIG. 7 which shows the looped end 65 of the webbing, secured by the stitches 66, and having an optional web pin or spacer 68 positioned within the looped end. The webbing 67 and looped end 65 are not shown in any of the other spool FIGS. 4, 5, and 8. The effective greater thickness provided by the web pin permits the looped end to be trapped within the wider portion 70 of the slot 63 between a portion of the shaft 110 and one of the pins such as 72b.

As can be seen from the views in FIGS. 5, 6 and 8 three pins 72a, 72b, and 72c are received within the through bores 60a–c. One of the through bores such as 60b has an open side which permits a side of the pin 72b to extend therefrom. FIG. 9 illustrates a plan view of one of the pins, such as 72b. The pin includes a central body 76 and ends 78a and 78b. While the construction of each pin is shown as identical they can be varied.

Positioned on the outer side surfaces 90a and 90b of the spool is a first and a second, preferably metal disk 92a and 92b. As can be seen in FIG. 6 disk 92a includes a centrally located shaped hole 94 and a first plurality of openings 96a, 96b, 96c and a second plurality of openings 97a, 97b, 97c. Positioned about each of the openings 96 and 97 is a counter bore 99. As will be seen from the description below a shaped shaft 110 extends through the shaped hole or opening 94 and drives the disks. In the embodiment shown the hole 94 is hexagonally shaped however, any type of key construction can be used. In the present embodiment of the invention the openings 96 and 97 are identical and evenly spaced about each disk. The first openings 96 are aligned to the placement of the bores 60 and pins 72. The second openings are aligned relative to the placement of positioning bosses 69 to insure proper alignment of the disks 92 and the spool 50. Disk 92b is of relatively similar construction. Each disk, respectively includes a plurality of locking teeth 98a and 98b. The ends 78a and 78b of each of the three pins 72a, 72b and 72c are fit into the openings 96 in each disk. Thereafter, each of the pins is secured to a respective disk by any one of the known securement techniques, such as mechanical fastening, welding, metal forming, etc. In the illustrated embodiment, the ends 78 of the pin are machined. However, the form of the ends will correspond with the technique used to secure the pins to related disks 92a,b. As an example, one or more of the pin ends can be tapered, or machined or include a head, etc. Any extending part of the pins such as a head or a formed over end would reside in the counter bores 99.

In the preferred embodiment of the invention, it is contemplated that the spool 50 will be fabricated of a lightweight, nonstructural plastic. As such, this plastic material is typically not capable of withstanding by itself, the large compressive belt loading generated during a crash. As mentioned the spool 50 is physically supported by a skeleton or frame provided by the plurality of bars or pins 72 and the externally positioned disks 92a, 92b. It should be appreciated that the number of pins or bars used will at a minimum be two and preferably three or more. The preferred embodiment of the invention is illustrated above utilizes three such pins or bars 72a–72c. Further, the cross-sectional profile of each of the through bores 60a–60c is chosen to conform to the shape of the exterior profile of each pin. As shown, both the through bores and the pins are cylindrically shaped. However, other profiles are within the scope of the invention. In addition, the pins are closely spaced relative to its corresponding bores 60a–c and may be pressed or loosely fit through the bores 60a–c such that each pin is totally or substantially enveloped by the spool material. In this way, any forces generated during retractor operation and including those higher level forces generated when the spool is locked will be distributed across a relatively large internal areas of the through bores, that is, the area of the spool in contact with pins.

Reference is made to FIGS. 10 through 13 which illustrate an alternate embodiment of the invention. The primary difference of this embodiment compared to that shown in FIGS. 4–7, is the position and construction of the web receiving slot 120. As can be seen, this slot 120 is radially positioned relative to the body 54 of the spool. A looped end 65 of webbing is positioned in the center bore 122 of the spool 50 with the shaft 110 thereafter inserted therein. The shaft 110 is shown in FIG. 12 for reference purposes and not shown in FIGS. 10, 11 or 13.

Reference is again made to FIGS. 1, 2 an 3 which also show a locking mechanism 130. A perspective view of the mechanism is shown in FIG. 14. The mechanism 130 includes a plurality of pawls 132a and 132b linked together by a center shaft 134 permitting the pawls to move in unison. The ends of the center shaft include pockets or cups 137a, 137b which are centered by piloting pins. The lower end 136 of each pawl is circularly shaped such that it conforms to and fits within the circularly shaped end 41 of a corresponding pocket 40 and 42, formed on each lower frame side wall 34a and 36a. This locking mechanism and frame design facilitates the simple drop-in placement of the locking mechanism in the frame 32 while providing lateral containment of the locking mechanism 130 within the frame sides and does not require the frame to be separated during insertion as is found in some prior retractors. The other end 138 of each pawl 132a,b contains a locking formation 140 for engagement with at least one tooth 98a,b. In the preferred embodiment, this locking formation includes a double tooth counter profile for engagement with end faces of two of the teeth 98a,b. As can be seen the locking formation leads against two teeth. Extending from pawl 132a is a pin 139 which is used to move the locking mechanism into engagement with the disks 92a and 92b. As can be seen in FIG. 1 the locking mechanism, during lock-up is at a specified angle relative to the frame 32. It has been found that in order to reduce tooth skipping and to absorb tooth shear loading the pawls 132a and 132b should lie on a vector of the specified angle. More specifically, the specified angle is between a first vector which radiates from the tip of the loaded tooth to the center of the shaft 110 and a second vector which extends from the tip of the loaded tooth to the axis of the pawl shaft 134. This angle should be in the range of 100 degrees to 110 degrees. In the embodiment shown this angle is 105 degrees.

Reference is again made to FIG. 2. As can be seen in FIG. 2 a spring assembly 14 is positioned on the left side of the frame 32. The spring assembly includes a plate 142, typically plastic, butted against frame side 34 and a cover 144, and a return spring 146. The return spring 146 is positioned inside the cover 144. One end of the spring 146 is secured to the cover and the other is secured to a spring arbor 112 as is typical of the art. The left end of the shaft 110 is fitted in the spring arbor 112 which can function as a bushing. The shaft 110 also extends through an opening 147 in the plate 142 which can also provide a bushing surface to support the left side of the shaft 110. The plate 142 additionally includes a positioning pin 143 (see FIGS. 2 and 14) to center or pilot the locking mechanism. The pin 143 enters a cup 137a formed on one of the pawls 132 and serves to properly locate same. The return spring 146 provides the bias force to retract the webbing 67.

Positioned on the right side wall 36 of the retractor is a second cover 156 and second plate 152 attached to the frame side 36. Extending from plate 152 is a pin 153 integrally molded therewith which enters cup 137b in the locking mechanism. As mentioned the pins 143 and 153 center and properly align the locking mechanism in place. The plate 152 includes an opening 154 which provides a bushing for supporting the right side of shaft 110. Common with most emergency locking retractors is the use of a web sensor and a vehicle sensor which sense the speed at which webbing is protracted and vehicle deceleration and then activate a member to initiate locking of a spool. As these types of sensors are known in the art they will not be discussed in detail. Rotationally coupled to the shaft 110 is a web sensor 160 which locks the spool from further rotation if the webbing 67 is protracted faster that a determinable speed. Typical of web sensors is a pawl plate which rotates with the right hand end of the shaft. Positioned on this pawl plate is at least one locking pawl which is moved into engagement with teeth on a cooperating part of the retractor. In the present invention this cooperating part is a clutch 170 having a central opening 172 permitting the clutch to freely rotate relative to the right hand end of the shaft 110. The clutch 170 includes a cavity 171 having an inner wall 174 with teeth 176 for engagement with the locking pawl of the web sensor. The pawl plate referred to above fits into the cavity 171 of the clutch 170. Further, another typical part of a web sensor is an inertia plate which is shown as plate 180 fitted against the clutch 170 and operatively coupled to the locking pawl. The inertia plate 180 functions such that when the webbing is protracted quickly it lags behind the motion of the pawl plate. The inertia plate 180 typically includes a cam or finger which operates upon the locking pawl moving same into engagement with the teeth 174 of the clutch 170. In the present invention the inertia plate includes an integral gear 182 having external teeth 184.

Located on the outside edge of the clutch 170 is a cam 176 having a slot 178 into which is received the pin 139 of the locking mechanism 130. The clutch 170 is biased in a clockwise manner, as viewed in FIG. 4 by a spring 186 which is diagrammatically shown. In normal operation, this spring 186 moves the locking mechanism's pin 139 outwardly in the slot 178 to prevent premature lockup. During a crash or other time when the webbing is protracted at a high rate the locking pawl of the web sensor moves into engagement with the clutch 170 coupling the clutch with the pawl plate and with the shaft 110 which drives the pawl plate. As mentioned above the clutch is free to rotate relative to the shaft. When the locking pawl is engaged with the teeth 174 the clutch will rotate in unison with the spool. As the clutch rotates it moves the locking mechanism pin 139 which in turn moves the locking mechanism into engagement with the teeth 98a,b on the disks 92a,b to halt the rotation of the spool 50.

As mentioned above retractors typically use a vehicle sensor 190. The vehicle sensor initiates spool lock-up upon sensing a vehicle deceleration above a specific limit. One such vehicle includes a ball 192 and saucer 194 of known construction. Upon sensing vehicle deceleration above the limit value the ball 192 moves to lift the saucer 194 upwardly. In the present invention a pin 198, shown in FIG. 15, with an extending pawl 200, shown in FIG. 4, is attached to the saucer 194. As the saucer 194 mover, the pawl 200 is moved into engagement with the teeth 184 on the inertia plate 180 thereby slowing the motion of the inertia plate relative to the pawl plate. This action causes the relative motion between the pawl plate and the inertia plate and causes the locking pawls to move and engage the teeth 174 of the clutch 170 again coupling the clutch to the shaft 110 through the pawl plate and causing the clutch to rotate. The rotation of the clutch 170 moves the locking mechanism into engagement with the disk teeth 98 locking the spool from further rotation as is done during web sensor activation.

One of the advantages of the present invention derives from the bent side wall construction of the frame. As an example, when the present retractor is locked-up relatively high loads are placed upon the spool and upon the frame 32 due to the belt forces. With regard to FIG. 1 the belt forces tend to drive the spool and frame sides upwardly. In the present invention the frame sides will not tend to separate as is true of many retractors in the prior art. This is primarily due to the bend or shoulder 34c and 36c provided the frame sides. Under loading, the frame sides will tend to move slightly closer together keeping the spool and locking mechanism in place.

Many changes and modifications in the above described embodiment of the invention can, of course, be carried out without departing from the scope thereof. Accordingly, that scope is intended to be limited only by the scope of the appended claims.

We claim:

1. A seat belt retractor (30) comprising:

a frame (32) having a base and two parallel side walls (34,36) extending therefrom, each side wall includes an outer portion having a shaft receiving opening and an inner portion and a shoulder therebetween, a first opening or pocket (40, 42) formed in at least the inner portion of each side wall for rotationally supporting a locking mechanism (130), the locking mechanism movable between a deactivated position and an activated position and when activated stops the rotation of a spool;

the spool (50, 54), rotatably positioned relative to the side walls, first and second disks (92a,b) engagable with the locking mechanism and rotatable with the spool.

2. The device as defined in claim 1 wherein each disk includes a first plurality of openings for receiving a corresponding one of the pins, each pin proximate its end being secured to a corresponding one of the disks.

3. The device as defined in claim 2 wherein the spool comprises a center cylindrical body (54) defining a surface about which seat belt webbing (67) is wound, the spool includes integrally formed end flanges (52a,b), and a plurality of pin receiving through bores equal in number to the plurality of pins, the spool supported relative to the disks by the pins which extend through the through bores.

4. The device as defined in claim 3 wherein the pins and bores cooperated to provide one of a loose and tight fit there between.

5. The device as defined in claim 1 wherein at least one of the pin receiving through bores is offset relative to a corresponding pin such that it only partially envelops the pin and wherein the webbing is fit between the shaft and such pin.

6. The device as defined in claim 1 including a return spring for biasing the shaft to permit the retraction of the webbing after it is protracted.

7. The device as defined in claim 1 wherein the pockets (40,42) are formed in the inner portions and in the shoulders.

8. The device as defined in claim 7 wherein the side wall outer portions are adjacent a corresponding one of the pawls to retain the locking mechanism laterally within the frame.

9. The device as defined in claim 1 wherein the locking mechanism includes two oppositely positioned pawls 132) rotationally mounted within a corresponding one of the pockets (40) and a bar (134) joining each pawl, the locking mechanism movable between a deactivated position and an activated position.

10. The device as defined in claim 9 including a locking mechanism pin (139) engageable with and moved by a clutch (170) to move the locking mechanism from the deactivated position to the activated position.

11. The device as defined in claim 10 including at least one of a web sensor and a vehicle sensor which when activated engages and moves the clutch to cause movement of the locking mechanism pin.

12. The device as defined in claim 10 wherein the clutch includes a pin receiving slot and wherein the pin is received in such slot.

13. The device as defined in claim 1 wherein the spool includes a plurality of bars or pins, the first and second disks positioned on opposite sides of the spool, the pins received within cooperating bores in the spool and joining the disks together, and wherein a shaft rotationally links the disks for providing an axis of rotation of the spool and disks, wherein the shaft is received and rotationally supported in the shaft receiving opening.

14. A seat belt retractor (30) comprising:

a frame (32) having a base and two parallel side walls (34,36) extending therefrom, each side wall includes an outer portion having a shaft receiving opening and an inner portion and a shoulder therebetween, a first opening or pocket (40,42) formed in at least the inner portion of each side wall for receiving a locking mechanism, a spool assembly (50), rotatably positioned between the side walls, comprising a spool (50) and first and second disks (92a,b), a plurality of bars or pins extend between the first and second disks and through the spool (50) to support the spool (50), each disk includes another shaft receiving opening at respective ends thereof to receive a particular one of the pins, the ends of each pin is secured to a corresponding one of the disks, the spool comprises a center cylindrical body (54) defining a surface about which a seat belt webbing is wound, the spool including integrally formed end flanges (52a, b), and a plurality of through bores equal in member to the plurality of pins, the spool supported to the disks by the pins which extend through the through bores, the shape of the through bores being conformally shaped to the exterior profile of the pins, the spool assembly (50) further includes a shaft (110) for rotationally supporting the disks and hence the plurality of pins and the spool, the shaft being received through the shaft receiving openings of the disks and supported relative to the side walls, a locking mechanism is provided to lock the disks and prevent same from rotating.

15. The device as defined in claim 14 including a return spring for biasing the shaft to permit the retraction of the webbing after it is protracted.

16. The device as defined in claim 14 wherein the locking mechanism includes two oppositely positioned pawls 132) rotationally mounted within a corresponding one of the pockets (40), a bar (134) joining each pawl, and a pin extending from one of the pawls, activation means engagable with the pin for moving same and the pawls into engagement with the disks.

\* \* \* \* \*